Figure 3:
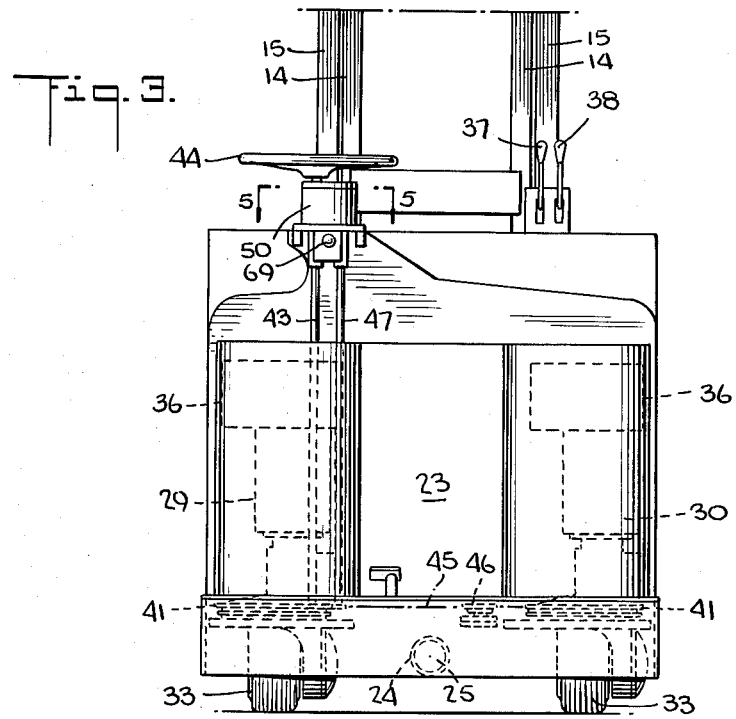

April 24, 1962 B. I. ULINSKI 3,031,024
ALL DIRECTIONAL INDUSTRIAL TRUCK
Filed July 23, 1959 5 Sheets-Sheet 1
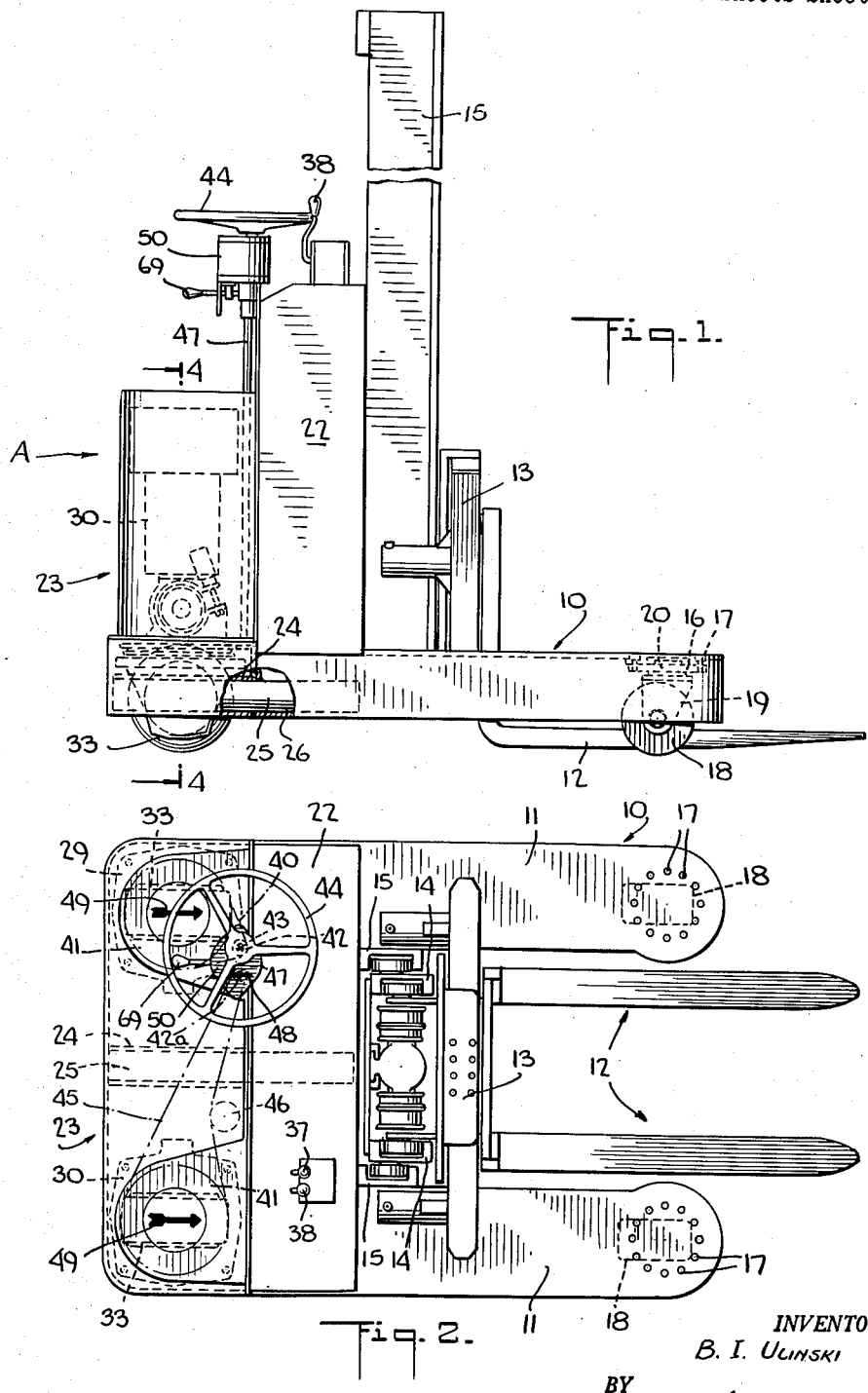
INVENTOR.
B. I. ULINSKI April 24, 1962 — B. I. ULINSKI — 3,031,024
ALL DIRECTIONAL INDUSTRIAL TRUCK
Filed July 23, 1959 — 5 Sheets-Sheet 2

INVENTOR.
B. I. ULINSKI
BY
ATTORNEY

April 24, 1962
B. I. ULINSKI
3,031,024
ALL DIRECTIONAL INDUSTRIAL TRUCK
Filed July 23, 1959
5 Sheets-Sheet 3
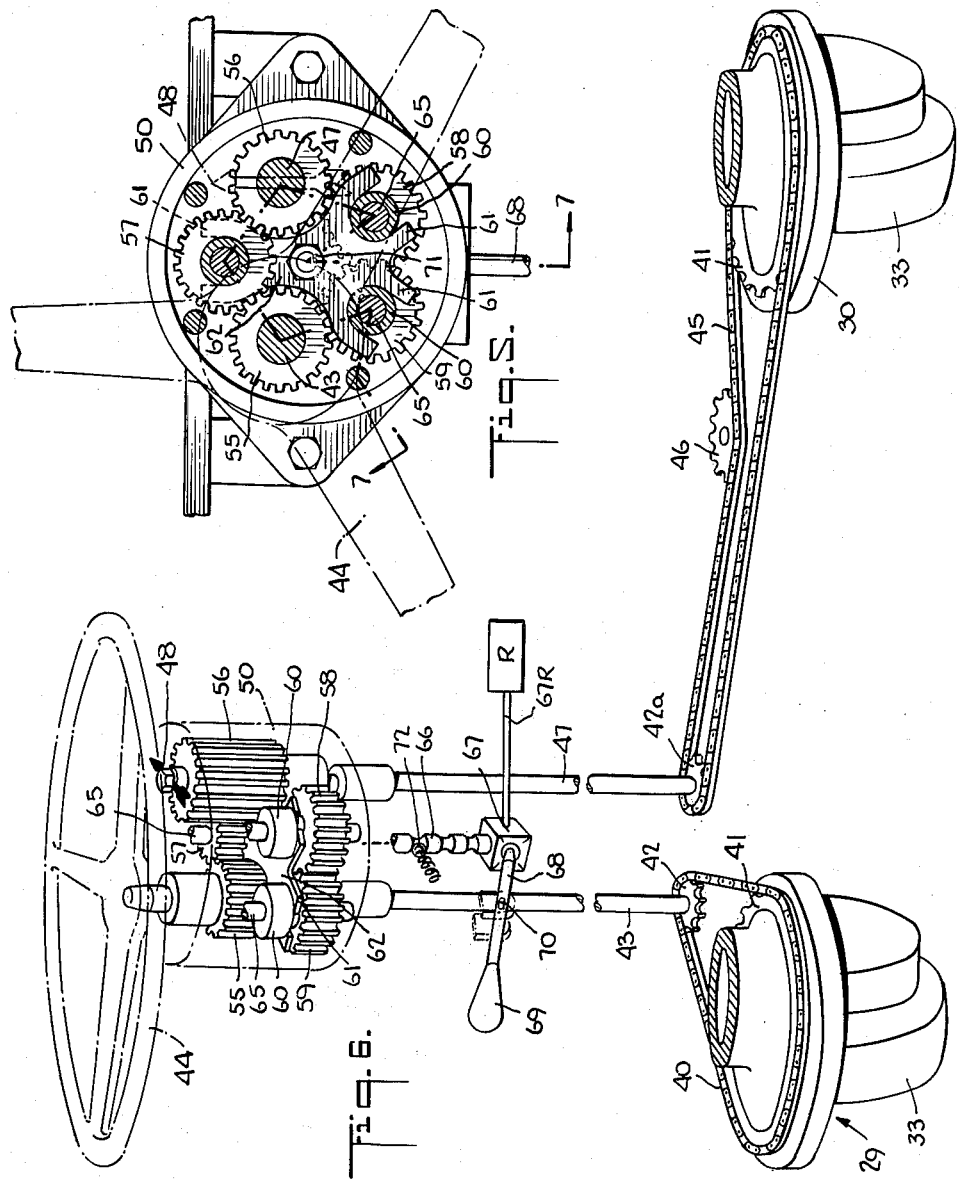
INVENTOR.
B. I. ULINSKI
BY
*A. H. Golden*
ATTORNEY

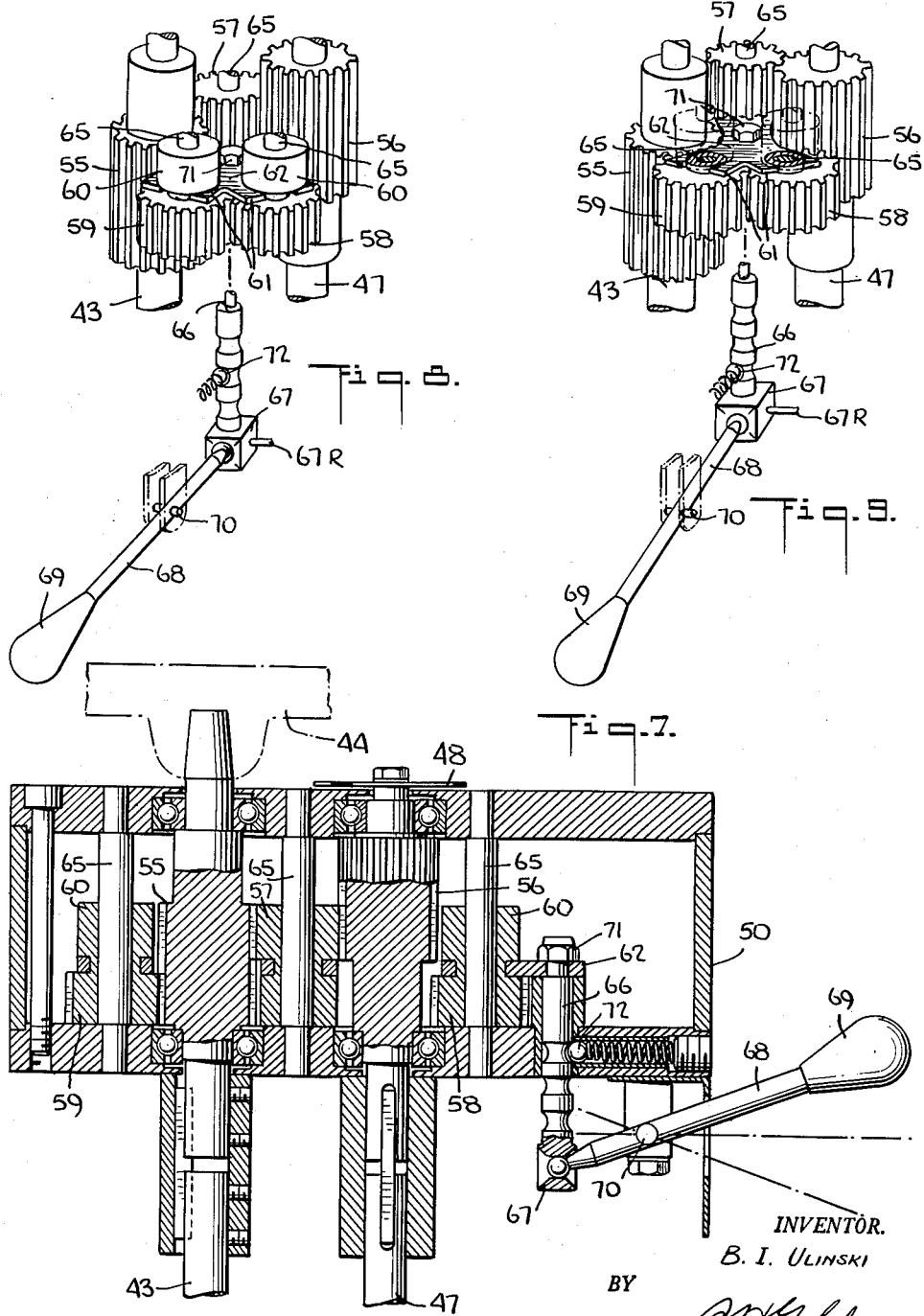

April 24, 1962  B. I. ULINSKI  3,031,024
ALL DIRECTIONAL INDUSTRIAL TRUCK
Filed July 23, 1959  5 Sheets-Sheet 5

INVENTOR.
B. I. ULINSKI
BY
ATTORNEY

United States Patent Office 3,031,024
Patented Apr. 24, 1962

3,031,024
ALL DIRECTIONAL INDUSTRIAL TRUCK
Bronislaus I. Ulinski, Flossmoor, Ill., assignor to The Yale and Towne Manufacturing Company, Stamford, Conn., a corporation of Connecticut
Filed July 23, 1959, Ser. No. 829,111
11 Claims. (Cl. 180—6.5)

This invention relates to an industrial truck, and more particularly to an industrial truck that is adapted for extreme maneuverability.

Those skilled in the art naturally appreciate that industrial trucks are required to move about in narrow aisles in warehouses and factories, and therefore must be highly maneuverable in order to handle loads in the manner required.

I have now conceived an industrial truck that is readily adapted for complete rotation within its own length and about a central axis thereof. Further, the truck of my conception is adapted for movement in a path that is angular to both its width and length. This high degree of maneuverability is inherent in the very simple construction of my truck invention, utilizing two steering and traction units, each of which is adapted for steering rotation bodily relatively to the truck. Preferably, the truck is equipped with other support wheels that take the form of two casters adapted to follow that movement of the truck brought about through the operation of the steering and traction units. As a feature of the invention the two steering and traction units are adapted for steering rotation relatively to the truck by a single steering wheel, this steering wheel being adapted to rotate the two steering and traction units in the same direction or in opposite directions.

As a further feature of this part of my invention, a novel form of control mechanism is utilized to determine whether the two steering and traction units shall be rotated in the same direction by the single steering wheel, or shall be rotated by the single steering wheel in opposed directions.

As a still further feature of the invention, the two steering and traction units are adapted to be locked against any steering movement whatsoever, whereupon the truck is then steered through the control of direction and speed of movement of the traction wheels of the two independent steering and traction units. Thus, when the two steering and traction units are locked against steering rotation, and one operates at a higher speed than the other, it is obvious that the truck will turn in a particular direction depending upon which traction wheel is rotated faster than the other. Further, by rotating the traction wheels in opposed directions, extremely sharp turning within the length of the truck and about its central axis is made possible.

As a particular feature of this invention, I interlock the directional power control mechanism of my traction units and the steering mechanism, to effect proper directional drive when the traction units steer in opposed directions.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception in which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Figure 4:
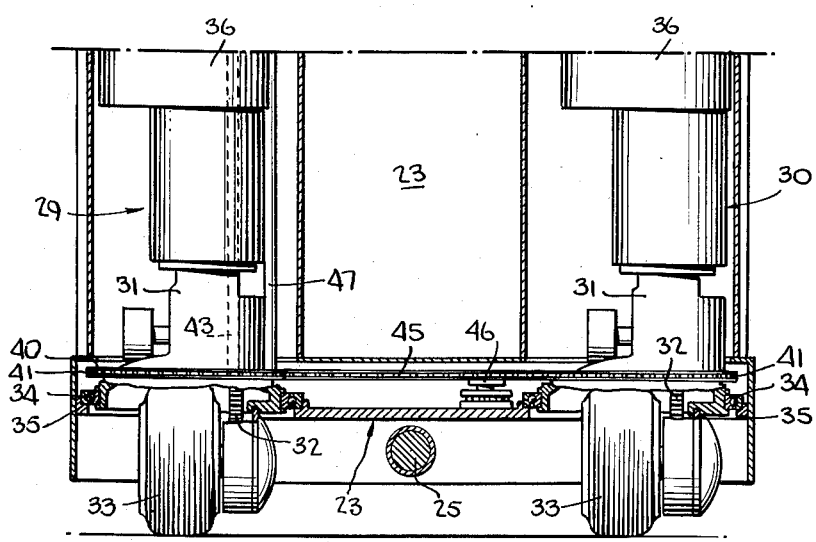
Figure 10:
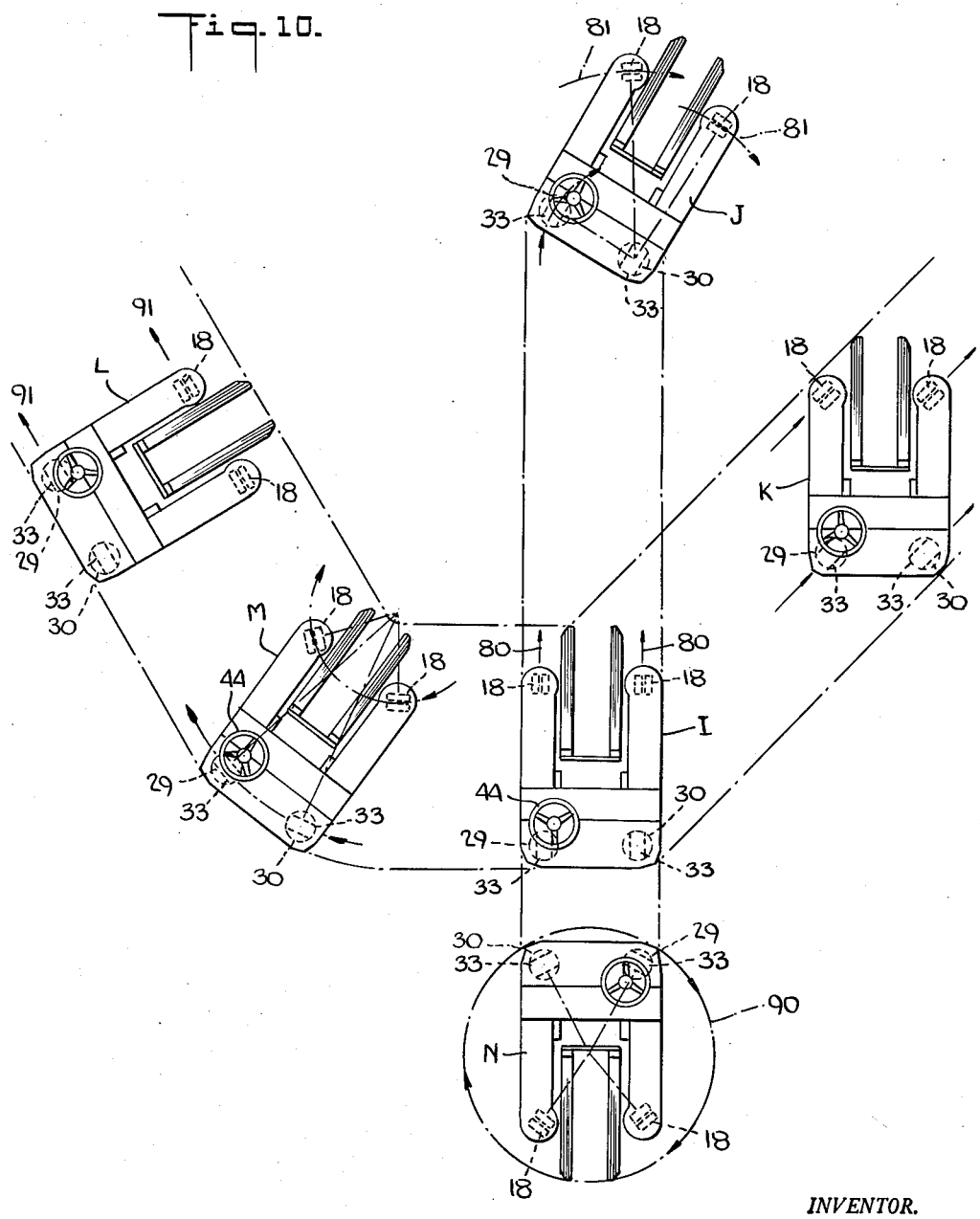

Referring now to the drawings,
FIG. 1 is an elevation of an industrial truck to which my invention has been applied;
FIG. 2 is a plan view of the truck of FIG. 1;
FIG. 3 is an end view of the truck of FIG. 1 taken in the direction of the arrow A of FIG. 1;
FIG. 4 is a section along lines 4—4 of FIG. 1;
FIG. 5 is a section taken along lines 5—5 of FIG. 3;
FIG. 6 is an exploded perspective view of the steering mechanism of my invention;
FIG. 7 is a section taken along lines 7—7 of FIG. 5, it being noted that this is a composite and a rather unusual section adapted best to illustrate the invention;
FIGS. 8 and 9 are views of the steering control mechanism of FIG. 6 in positions different from that shown in FIG. 6;
FIG. 10 illustrates the maneuvering of the truck.

Referring now more particularly to the drawings and especially FIGS. 1 to 4 inclusive, I show an industrial truck having extending forward what is termed a U-frame 10. This frame 10 has two legs 11 between which are positioned forks 12 constituting the load lifting means for the particular truck I have chosen to illustrate in my invention. These forks 12 are mounted on a usual type of carriage 13 that is in turn adapted for vertical movement relatively to secondary uprights 14, the secondary uprights being in turn movable relatively to primary uprights 15. The type of material handling mechanism utilized with my truck is not important, as those skilled in the art will readily appreciate and is merely illustrated here to show the environment in which my invention is best used.

Each leg 11 of the U-frame of my truck has secured thereto a caster mounting 16 through a series of bolts 17. Each caster mounting 16 carries a caster wheel 18 in a bracket 19, the bracket being adapted for rotation on the axis 20. For the purposes of my invention it need merely be understood that the caster wheels are adapted for rotation on an offset axis 20 as is common in wheels of the particular class, so that the wheels may readily assume various positions in accordance with the path of movement of the truck.

The traction units of the truck of my invention are adapted for operation by electric motors, so that the truck is equipped therefore with a battery compartment 22 within which may be mounted the usual type of battery, as will be understood by those skilled in the art.

Forward of the battery compartment 22 there is mounted what I term the traction supporting frame of the truck, indicated generally by the reference numeral 23. This traction frame is formed with a heavy, strong central bearing tube 24, as is best seen in FIGS. 2 and 4, and extending into this bearing tube is a shaft 25 that is welded at 26 to the main frame 10 of the truck. This main frame of the truck, of course, includes the legs 11, as those skilled in the art will appreciate. Because of the particular construction, the traction frame of the truck may pivot relatively to the main U-frame at an extremely low point, giving stability while yet contributing full tractive contact between the traction wheels and the ground, as will be apparent presently.

The traction frame 23, as probably best illustrated in FIGS. 3 and 4, has mounted thereon a pair of steering and traction units designated by reference numerals 29 and 30. Each of these steering and traction units is of that type well described in detail in my earlier Patent No. 2,842,216. Thus each steering and traction unit comprises a motor as shown in FIG. 4, a gear box 31, traction transmitting gears 32 and a traction wheel 33. Further, each steering and traction unit is mounted for steering rotation relatively to the traction frame 23 by means of ball bearings 34 carried by a mounting unit 35, all in accordance with the disclosure of my earlier Patent No. 2,842,216.

Above the motor there is carried a container 36 within which are found the contactors for the motor, all as is well known. Each motor will drive its particular traction wheel 33 in either of opposed directions, and at a speed determined by the operation of the control mechanism, the control mechanism preferably including a series of contactors and manually operated controller means. Thus, it is possible to use controller means having two separate controls, one for each of the motors, and these controls may be those conventional means that have been earlier employed for traction units of the particular class.

In FIG. 3, I show two handles 37 and 38 that form part of the controller means. Handle 37 controls the operation of the motor of traction unit 29, while handle 38 controls the operation of the motor of traction unit 30. When both handles 37 and 38 are moved forwardly in the same direction, both traction units drive forwardly. If both handles are moved in a reverse direction, both traction units will reverse. Obviously, also, it is possible to move the handles 37, 38 of the controller means in opposed directions so that the wheels 33 will rotate in opposed directions. Also, it is possible to move the control handles so as to rotate the wheels in the same or opposed directions, and at different speeds. Further details of the controller means are not important to an understanding of my invention, since the truck that forms the subject of the present application need merely utilize controller means that are conventional. As will be understood by those persons skilled in the art, the controller handles 37, 38 may simply operate two conventional controllers, one for each of the steering and traction units 29, 30. It is merely necessary to know that my truck has controller means that will control the speed and direction of drive of each individual steering and traction unit 29, 30 for driving the traction wheels 33, 33 independently of each other in the same or opposed directions at the same or different speeds.

As was earlier set forth, each of the steering and traction units, while being adapted for individual control so as to operate at a particular speed and direction, is adapted also for steering rotation in such a manner that the two steering and traction units may be rotated in the same direction or in opposed directions by a single steering wheel. The mechanism whereby this may be accomplished is best illustrated in FIG. 6, but in describing the operation of the steering mechanism, reference will also be made to FIGS. 2–4, as well as FIGS. 6–9.

In FIGS. 3 and 6 it will be seen that the left hand steering and traction unit 29 is adapted for rotation by a sprocket chain 40 running about a sprocket 41 that is integral with the steering and traction unit. While the details of construction through which the sprocket 41 is attached are not illustrated, those skilled in the art will appreciate that no particular skills will be involved in applying a sprocket in position. Sprocket chain 40 passes over a small sprocket 42 fixed to the lower end of a vertically positioned shaft 43. The location and position of the shaft 43 relatively to the truck is probably best seen in FIG. 3. At its upper end, the shaft 43 has keyed thereto in any suitable manner a steering wheel 44. It is now obvious that rotation of the steering wheel 44 will effect steering rotation of the steering and traction unit 29.

The right hand steering and traction unit 30 is adapted to carry a sprocket 41 that is a duplicate of the sprocket 41 of steering and traction unit 29. This sprocket 41 is engaged by a sprocket chain 45 running over an idler sprocket 46 and then over a sprocket 42a that is a duplicate of the first sprocket 42. Sprocket 42a is integral with a second vertical shaft 47 that extends upwardly and parallel to the steering shaft 43 carrying steering wheel 44. At this upper end, shaft 47 carries an arrow 48 to indicate the position of the shaft relatively to the steering position of the steering and traction unit 30. It is well at this point to indicate that each of the steering and traction units has also an arrow bearing reference numeral 49, as best seen in FIG. 2, the two arrows 49 illustrating the positions of the two steering and traction units.

Portions of the two steering shafts 43 and 47 lie within a casing 50 shown in phantom in FIG. 6. Within the casing there is found extremely novel steering control means including gear mechanism for controlling the positions occupied by the steering and traction units, as well as their steering relationship. Fixed to the shaft 43, is a gear 55 shown not only in FIG. 6, but also well illustrated in FIGS. 5, 7, 8, and 9. Similarly fixed to the steering shaft 47 is a gear 56. Mounted also within the casing 50 are three gears designated individually by reference numerals 57, 58 and 59. The three gears 57, 58 and 59 are adapted for sliding movement together relatively to the two gears 55 and 56, it being understood that the gears 55 and 56 do not slide. It will be noted, of course, that gear 56 is longer than gear 55 for a purpose that will be quite evident from a further reading of this specification.

Each of the gears 57, 58 and 59 has an integral collar 60 slightly spaced from the gear for the entry of a U-shaped fork portion 61, there being naturally three of these U-shaped forks, all forming part of a flat plate 62. Each of the three gears 57, 58 and 59, together with its collar, is slidable on a shaft 65, there being three of these shafts, or one for each gear, the shafts being fixed within the housing 50. For operating the plate 62 and thereby the gears 57, 58, 59, I equip my steering control means with a control and positioning rod 66 having at its lower end a block 67. Block 67 is formed with an opening in which fits one end of a control handle 68. The other end of handle 68 has a manually actuated knob 69, the control handle 69 being itself pivoted at 70 relatively to the casing 50.

Obviously, vertical movement of the handle 68 through knob 69 on pivot 70 will effect vertical movement of the control rod 66 relatively to the casing 50. Control rod 66 is suitably fixed at 71 to the plate 62, so that vertical movement of the control rod 66 contributes vertical movement to the plate 62. The control rod 66 has a series of scallops coacting with a detent ball 72, this detent ball acting to retain the rod 66 yieldingly in any position to which it is moved by the handle 68, thereby yieldingly retaining in position the plate 62 and with it the three control gears 57, 58 and 59.

In FIG. 6 the three control gears have been moved to their lowermost position through movement of the knob 69 to its highest position. In other words, the rod 66 has been moved down to its lowest possible level. In this position of the mechanism, gear 57 is in engagement with both gears 55 and 56 of the two steering shafts 43 and 47. The two gears 59 and 58 are also in engagement with the gear 55 but are out of engagement with the gear 56, being below that gear. Because of this relationship of the gears, rotation of the shaft 43 will contribute rotation of the shaft 47, with the shaft 47 rotating in the same direction as shaft 43. In other words, rotation of the steering wheel 44 will rotate the two steering and traction units 29 and 30 relatively to the truck in the same direction.

Let us assume now that the handle 68 is moved to its lowermost position illustrated in FIG. 9. Now, the three control gears 57, 58 and 59 have been moved to their uppermost position, carrying the gear 57 above gear 55, so that it is no longer in engagement with gear 55. However, gears 58 and 59 have been brought into engagement with gears 55 and 56, so there is now a train of gear engagement running from gear 55 to gear 59 to gear 58 to gear 56. This means that rotation of the steering wheel 44 will rotate both steering traction units in opposite directions relatively to one another.

In FIG. 8 the steering handle 68 has been moved by the knob 69 to a neutral or central position so that all five gears 55, 56, 57, 58 and 59 are in engagement. This causes a locking of all of the gears, so that it becomes impossible to steer the truck through wheel 44, it being impossible to rotate the steering wheel 44. In other words, the steering and traction units have been locked against steering rotation. The steering of the truck can therefore be accomplished only through varying the direction and speed of rotation of the traction wheels 33 of the two steering and traction units 29 and 30. This in turn is accomplished through the individual motor controls of the steering and traction units 29 and 30 by control handles 37, 38 as I have already indicated.

Referring now to FIG. 10, I illustrate the manner in which a truck embodying my invention may be maneuvered. In position I, FIG. 10, the truck is shown with its steering and traction wheels aligned with the longitudinal axis of the truck and the caster wheels similarly aligned. Obviously, should the traction wheels 33 be rotated clockwise at the same speed, the truck will move in the direction of the arrow 80. Should the motion of the two traction units be reversed, the traction wheels 33 will rotate in a counter-clockwise direction and the truck will move longitudinally in a direction reversed to that in which the arrows 80 are pointed.

Let us conceive that the truck in position I has its steering mechanism locked against rotation so that the steering and traction units cannot be rotated by the steering wheel 44. In other words, the two steering and traction units are locked with the wheels aligned as shown at I by manipulation of the gears in gear box 50. If now the two controls 37, 38 for the two motors of the steering and traction units 29 and 30 are actuated so that one steering and traction unit rotates at a faster speed than the other, the truck will move to the right or to the left, and away from the direction of the pointed arrows 80. Thus, at position J in FIG. 10, the traction wheel 33 at the left side of the truck is being rotated at a greater speed than the right-hand wheel 33 so that the truck moves to the right as is clearly illustrated. Similarly the caster wheels 18 will be aligned as shown by the arrows 81, this being the direction of rotation of the truck under the influence of the greater speed of the left wheel 33. If one steering and traction unit is driven in one direction and the other in a reverse direction, the truck will turn even sharper.

Let us now return to position I, and assume that the operator wishes to effect movement of the truck at an angle to its longitudinal axis but with the truck in the position relatively to the longitude and latitude illustrated at I. To accomplish this, the operator will move handle 68 through knob 69 putting the steering mechanism into the position shown in FIG. 6. Now the two steering and traction units 29, 30 may be rotated together in the same direction relatively to the truck. Suppose that the operator now rotates the traction units so that the wheels 33 are aligned as shown at K in FIG. 10. Should both wheels now be driven at the same speed, the truck will move angularly as shown by the four arrows K. Naturally the caster wheels will assume a proper position to allow this movement of the truck.

Let us assume now that the truck is once again in its position at I and that the operator wishes the truck to be adapted for movement sidewise as shown at L in FIG. 10. It will be noted that at L the steering and traction units have been rotated so that the wheels 33 are directed at right angles to the longitudinal axis of the truck, with the caster wheels 18 naturally assuming the same position when the truck moves. In order to move the steering and traction units so that the wheels 33 will be aligned as illustrated at L, the shifting handle must first be moved into its full downward position illustrated in FIG. 9. In this position the steering wheel 44 will rotate the two steering and traction units in opposed directions. This is necessary in order to allow steering when in position L. Thus, the steering and traction units 29 and 30 were rotated in opposed directions in order to move them into the position shown at L. Naturally, since the units were moved in opposed directions, it is obvious that if the steering and traction units are controlled to drive in the same direction at L as at I, the wheels 33 will rotate in opposed directions tending to pull the truck apart.

In order that the wheels may rotate in the same direction, it is obvious that the directional drive must be reversed when the steering and traction units are steered in opposed directions. This reversal of the drive of the steering and traction units may be effected manually by the operator moving the controller of one motor forwardly as he moves the controller of the other motor rearwardly. As part of my concept I have means for reversing the motor drive actuated simultaneously with the movement of the handle 68 by knob 69. This is shown effectively in FIG. 6 where the block 67 actuates the reversing switch lever 67R for controlling a reversing switch R of any suitable type, as all those skilled in the art will readily appreciate. Switch R is merely arranged for reversing relatively to one of the units 29, 30, the directional control that normally is applied by the controller means. Thus, when handle 68 is moved to position for opposed steering of the units 29, 30, switch R will in effect synchronize the driving direction of both units.

With the directional rotation of the two wheels 33 synchronized through switch R, the operator need now move the control handles 37, 38 for both motors in the same direction to go to one side at L, FIG. 10. To effect drive to the opposed side, the control handles 37, 38 for the two traction motors need simply be moved in an opposed direction.

With the truck positioned as at L, the rotation of the steering wheel 44 can bring about effective movement of the truck as shown at M. The motors will operate the wheels 33 exactly as at L, but the wheels will have been steered in opposed directions from their position at L to allow for the type of motion required. Thus, the left-hand steering and traction unit 29 will have been rotated clockwise at M, whereas the steering and traction unit 30 will at M have been rotated counter clockwise. The traction wheels rotate in the same direction because of the automatic reversal.

At N in FIG. 10 there is illustrated an even more extreme type of motion of the truck than at M. Thus, the steering and traction units have been rotated somewhat more in the same direction as at M so that the truck will move in a minimum size circle as is clearly shown by the arrows. In other words, the truck will rotate substantially within its own length.

It has now been rather clearly illustrated that at I in FIG. 10, the truck is adapted for movement in a straight linear path forwards or backwards. It has been further demonstrated that by increasing the speed of one of the steering and traction units relatively to the other, as for example unit 29, the truck may be turned into a path that is angular from the straight path, all as shown at J in FIG. 10. Further, if the steering and traction units are reversed in directional drive, extreme directional steering is obtained.

It has further been indicated that with the two steering and traction units rotated together in the same direction, the truck may be given an angular movement relatively to its longitudinal axis as clearly shown at K. At L in FIG. 10 it has been indicated that by placing the steering and traction units in a position with the traction wheels at right angles to the longitudinal axis of the truck, the truck will move sidewise for sidelift. It has been further illustrated at M in FIG. 10 that direction may be imparted to the truck, while moving sidewise, through conditioning the steering apparatus so that the steering and traction units are rotated in opposed directions by wheel 44.

It has also been shown how the directional drive of the traction units is automatically controlled so that both units drive in the same direction when steered in opposed directions so as not to confuse the operator.

I believe that the rather considerable merits of my invention will now be fully understood. I claim:

1. In a truck of the class described, two steering and traction units individually mounted for steering rotation relatively to said truck and each having a traction wheel driven thereby, steering means, means whereby said steering means simultaneously rotate one of said steering and traction units in one direction and the other of said steering and traction units in an opposed direction, means for locking said steering and traction units against steering rotation, and controller means for said steering and traction units adapted to effect drive of said traction wheels independently of each other in the same or opposed directions at the same or different speeds.

2. In a truck of the class described, two steering and traction units individually mounted for steering rotation relatively to said truck, caster means on which the truck moves with said steering and traction units when driven and steered by said units, steering means, means whereby said steering means rotate simultaneously both of said steering and traction units relatively to said truck for steering the truck, movable control means for locking said steering means so that said steering and traction units cannot be steered, and controller means for said steering and traction units to determine the speed and direction of drive of each of said steering and traction units independently of the other, said controller means being effective through the driving of said units for steering the truck on the units and caster means when said steering means are locked.

3. In a truck of the class described, two steering and traction units individually mounted for steering rotation relatively to said truck at one end thereof, two caster wheels at the other end of the truck, steering means, means whereby said steering means rotate said steering and traction units relatively to said truck, control means for controlling said steering means, said control means in one position effecting operation of said steering means to rotate said steering and traction units in opposed directions, said movable control means in a second position effecting steering rotation of said units in the same direction, while in a third position locking said steering means so that said steering and traction units cannot be steered, and controller means for said steering and traction units to determine the speed and direction of drive of said steering and traction units.

4. In a truck of the class described, two steering and traction units individually mounted for steering rotation on the truck, and each having a traction wheel, additional wheels on which the truck moves with said traction wheels of said steering and traction units when driven and steered by said traction wheels, controller means controlling the speed and direction of drive of each individual steering and traction unit for driving said traction wheels independently of each other in the same or opposed directions at the same or different speeds, said controller means by so controlling the drive being effective for steering the truck while said units are held with said traction wheels aligned with the longitudinal axis of said truck, steering means including means effective for holding said steering and traction units with said traction wheels aligned relatively to the longitudinal axis of the truck, and for rotating said steering and traction units in opposed directions to steer said traction wheels relatively to said longitudinal axis of the truck, said steering means being effective for steering the traction wheels to positions generally parallel to the transverse axis of the truck with said controller means controlling said traction units to drive said traction wheels at the same speeds and in directions for effecting sidewise movement of said truck while steered by said steering means.

5. In a truck of the class described, two steering and traction units individually mounted for steering rotation on the truck, and each having a traction wheel, additional wheels on which the truck moves with said traction wheels of said steering and traction units when driven and steered by said traction wheels, controller means controlling the speed and direction of drive of each individual steering and traction unit for driving said traction wheels independently of each other in the same or opposed directions at the same or different speeds, means for locking said steering and traction units in predetermined aligned positions relatively to the truck on their steering mountings and for unlocking said steering and traction units, said controller means by controlling the drive being effective to steer the truck while said units are locked against steering, steering means for rotating said steering and traction units in opposed directions relatively to said predetermined aligned positions when said units are unlocked whereupon said controller means by controlling the drive of said traction wheels in opposed directions effects steered movement of said truck by said steering means.

6. In a truck of the class described, two steering and traction units individually mounted for steering rotation on the truck, and each having a traction wheel, additional wheels on which the truck moves with said traction wheels of said steering and traction units when driven and steered by said traction wheels, controller means controlling the speed and direction of drive of each individual steering and traction unit for driving said traction wheels independently of each other in the same or opposed directions at the same or different speeds, said controller means by so controlling the drive being effective for steering the truck while said units are held in predetermined aligned positions relatively to said truck, steering means for rotating said steering and traction units in opposed directions relatively to said predetermined aligned positions whereby to steer the truck, and means for reversing the control applied by said controller means relatively to one of said steering and traction units so as to facilitate the driving of the traction wheels in directions that are in effect the same when the units are steered in opposed directions by said steering means.

7. In a truck of the class described, two steering and traction units individually mounted for steering rotation on the truck, and each having a traction wheel, caster wheels on which the truck moves with said traction wheels of said steering and traction units when driven and steered by said traction wheels, controller means controlling the speed and direction of drive of each individual steering and traction unit for driving said traction wheels independently of each other in the same or opposed directions at the same or different speeds, means for locking said steering and traction units on their steering mountings in position with the traction wheels aligned with the longitudinal axis of the truck and for unlocking said units for steering rotation, said controller means by controlling the drive being effective to steer the truck while said units are locked, steering means for rotating said steering and traction units in opposed direction when said units are unlocked whereby to steer said traction wheels relatively to said longitudinal axis of the truck, said steering means being effective for steering the traction wheels to positions generally parallel to the transverse axis of the truck to steer the truck sidewise, and means for reversing the directional control applied by said controller means relatively to one of said steering and traction units so as to facilitate the driving of the traction wheels in directions that are in effect the same when the truck is steered sidewise.

8. In a truck of the class described, two steering and traction units individually mounted for steering rotation on the truck and each having a traction wheel, caster means on which the truck moves with said traction wheels of said steering and traction units when driven and steered by said traction wheels, means for locking said units on their mountings in positions with both traction wheels aligned with the longitudinal axis of the truck, and for unlocking said units for steering rotation, steering means effective when said steering and traction units are unlocked for rotating said units relatively to one another into angular positions on their mountings so as to steer the truck, and controller means controlling the speed and direction of drive of each individual steering and traction unit for driving said traction wheels independently of each other in the same or opposed directions at the same or different speeds, whereby to steer the truck while said units are locked by said locking means and to effect drive of said traction wheels in the same direction and at the same speed when said steering and traction units are rotated by said steering means.

9. In a truck of the class described, two steering and traction units individually mounted for steering rotation relatively to said truck and each having a traction wheel driven thereby, steering means, means whereby said steering means rotate said steering and traction units relatively to said truck, control means for controlling the steering rotation of said steering and traction units and adapted selectively to effect the rotation of said steering and traction units in opposed directions and the locking of said steering and traction units against steering rotation with said traction wheels in alignment with the axis of the truck, controller means for said steering and traction units adapted to effect drive of said traction wheels independently of each other in the same or opposed direction at the same or different speeds, and means for reversing the directional drive of one of said steering and traction units when said steering control means effect rotation of said steering and traction units in opposed directions.

10. In a truck of the class described, two steering and traction units individually mounted for steering rotation on the truck and each having a traction wheel, the ground engaging wheels of the truck consisting in the two traction wheels and one or more caster wheels, each of said one or more caster wheels rotating in its castering axis to steer while the steering and driving of the two traction wheels control the direction in which the truck moves, controller means controlling the speed and direction of drive of each individual steering and traction unit for driving said traction wheels independently of each other in the same or opposed directions at the same or different speeds so as to steer the truck while said units are held in predetermined aligned positions relatively to said truck, steering means for rotating said steering and traction units relatively to said predetermined aligned positions on their mountings so as to steer the truck, and said controller means being adapted to control said traction units to effect drive of each of said traction wheels at the same speed and direction when said steering and traction units are steered by said steering means.

11. In a truck of the class described, two steering and traction units individually mounted for steering rotation on the truck and each having a traction wheel, said units adapted to align the traction wheels with the longitudinal axis of the truck, the ground engaging wheels of the truck consisting in the two traction wheels and one or more caster wheels, each of said one or more caster wheels rotating in its castering axis to steer while the steering and driving of the two traction wheels control the direction in which the truck moves, steering means for rotating said steering and traction units into angular positions relatively to one another on their mountings so as to steer the truck, and controller means controlling the speed and direction of drive of each individual steering and traction unit for driving said traction wheels independently of each other in the same or opposed directions at the same or different speeds, whereby to steer the truck while said traction wheels are aligned with the truck axis and to effect drive of said traction wheels in the same direction and at the same speed when said steering and traction units are rotated by said steering means.

References Cited in the file of this patent
UNITED STATES PATENTS

| | | |
|---|---|---|
| 1,038,615 | Macrae | Sept. 17, 1912 |
| 1,125,184 | Schleicher | Jan. 19, 1915 |
| 1,255,775 | Mueller | Feb. 5, 1918 |
| 1,588,395 | Winn | June 8, 1926 |
| 1,863,504 | Schmid | June 14, 1932 |
| 2,249,838 | Le Munyon | July 22, 1941 |
| 2,456,865 | Cottingham | Dec. 21, 1948 |
| 2,581,551 | Myrmirides | Jan. 8, 1952 |
| 2,715,534 | Hoge et al. | Aug. 16, 1955 |
| 2,913,063 | Brown | Nov. 17, 1959 |
| 2,925,887 | Gibson | Feb. 23, 1960 |

FOREIGN PATENTS

| | | |
|---|---|---|
| 451,813 | Great Britain | Aug. 12, 1936 |